United States Patent [19]

Ogura et al.

[11] Patent Number: 4,717,975
[45] Date of Patent: Jan. 5, 1988

[54] ERASING DEVICE

[75] Inventors: Tokihiko Ogura, Kanagawa; Tsuguhide Sakata, Tokyo; Kazuhiko Ito, Tokyo; Masahiko Ogawa, Tokyo, all of Japan

[73] Assignee: Canon Kabushiki Kaisha, Tokyo, Japan

[21] Appl. No.: 701,421

[22] Filed: Feb. 14, 1985

[30] Foreign Application Priority Data

Feb. 14, 1984 [JP] Japan .................................. 59-25913
Feb. 18, 1984 [JP] Japan .................................. 59-29278

[51] Int. Cl.$^4$ .............................................. G11B 5/03
[52] U.S. Cl. ..................................................... 360/66
[58] Field of Search ........................................ 360/66

[56] References Cited

U.S. PATENT DOCUMENTS 4,005,482  1/1977  Castro et al. ........................... 360/66
4,438,466  3/1984  Fawkes et al. ......................... 360/66

Primary Examiner—Vincent P. Canney
Attorney, Agent, or Firm—Toren, McGeady & Associates

[57] ABSTRACT

An erasing device includes a magnetic head, a drive motor for rotating a magnetic disc relative to the magnetic head, an erase signal source for producing an erase signal which varies periodically, and apparatus for causing the head to generate magnetic fields with the erase signal, wherein the frequency $f_V$ of rotation of the magnetic disc and the frequency $f_E$ of the erase signal together satisfy the following condition so that no nodes of the erasing fields are fixed at any point on a track of the magnetic disc during a plurality of rotations of the magnetic disc:

$$f_E \neq (k/2)f_V$$

where k is a positive integer.

14 Claims, 11 Drawing Figures

ERASING DEVICE

BACKGROUND OF THE INVENTION

1. Field of the Invention

This invention relates to devices for magnetically erasing the magnetically recorded information from record bearing media.

2. Description of the Prior Art

The conventional erasing devices in/for magnetic recording and/or reproducing apparatus for recording information, such as video signals on record bearing media such as magnetic sheets, and/or reproducing the recorded information may be divided broadly into the following categories:

(a) Information is erased from all the recording tracks at once by a bulk eraser;

(b) Besides the recording and/or reproducing head, an erasing head is provided, and the information is erased from track to track by an A.C. or D.C. erase signal; and (c) The recording and/or reproducing head also serves for erasing purposes, and a gradually damping direct current with its polarity changed in a prescribed period is applied thereto when each recording track is erased.

Of these, (a) is incapable of erasing a desired track alone. In (b), the use of the erasing head in addition to the recording and/or reproducing head calls for an increase in the complexity of the head mechanism. (c) takes a considerably long time to completely remove the residual strain because erasing is effected by the D.C. field that is gradually damping and which changes its polarity in a prescribed period.

To eliminate the above-described problem, according to one of the preceding patent applications assigned to the assignee of the present invention, there has already been proposed an erasing device in which the erase signal for causing the magnetic head to generate a magnetic field which has a form which includes a wave of constant amplitude for a time period $T_{E1}$ (see FIG. 1) followed by a damping wave for a time period $T_{E2}$ with their frequencies being low outside the frequency band of the recording or reproducing signals, whereby the information can be erased in any desired recording track and at an over-widened width of the recording track with improved efficiency. This is disclosed in Japanese Patent Application No. SHO 57-219659 (corresponding to U.S. patent application Ser. No. 560,413 filed Dec. 12, 1983).

According to another preceding patent application assigned to the assignee of the present invention, there has already been proposed an erasing device in which the time necessary to remove the residual strain is shortened either by increasing the frequency of the aforesaid damping wave from that of the constant-amplitude wave, or by lowering the relative speed of the record bearing medium to the magnetic head in the time $T_{E2}$ from that in the time $T_{E1}$. This is disclosed in Japanese Patent Application No. Sho 58-15821 (corresponding to U.S. patent application Ser. No. 576,034 filed Feb. 1, 1984).

In the above-described erasing devices according to the patent applications assigned to the assignee of the present invention, the erasing devices use the alternating erase signal. Upon further investigation of the interrelationship between the relative rotation of the magnetic head and the record bearing medium and the magnetic field produced on the magnetic head by the erase signal, it has been found that when the frequency of the aforsaid relative rotation and the frequency of the aforesaid erase signal have a certain relation, a number of nodes appear on the erasing field fixed at positions on the track of the record bearing medium for a plurality of relative rotations of the medium and the head. The point is that sufficient erasing cannot be achieved at these nodes, and there is room for still more improvement.

Figure 1:
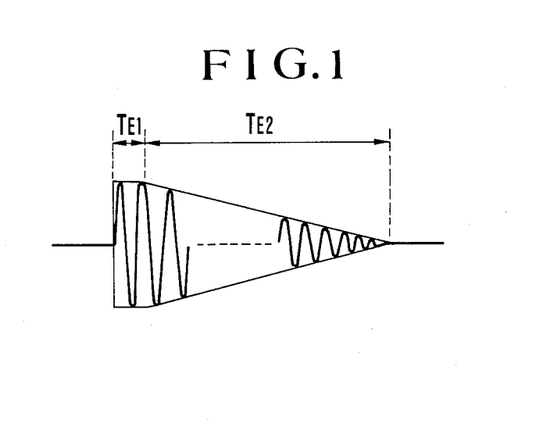
FIG. 1 is a waveform illustrating an example of the erase signal usable in the erasing device of the invention.
Figure 2:
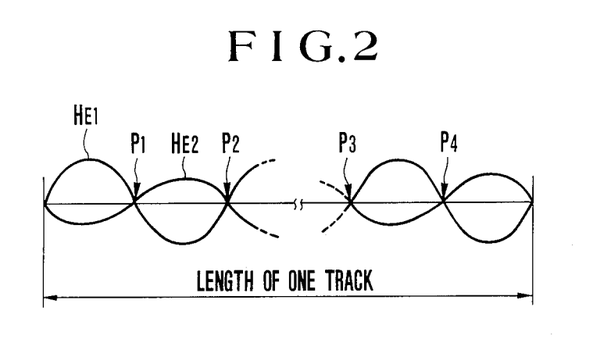
FIG. 2 is a waveform of the erasing magnetic field explaining the conventional drawback in the erasing device using the alternating erase signal.

For example, FIG. 2 illustrates the manner in which an erasing magnetic field is formed along the selected concentric track of the disc-shaped magnetic sheet which is erased by applying the erase signal of FIG. 1 to the magnetic head, while the magnetic sheet is being rotated. In FIG. 2, $H_{E1}$ and $H_{E2}$ identify two waves of the erasing field arbitrarily chosen from those due to the erase signal of FIG. 1. When the frequency $f_E$ of the erase signal and the frequency $f_V$ of rotation of the magnetic sheet lie in the following relationship:

$$f_E = (k/2)f_V \text{ (where k is a positive integer)}$$

the erasing field has nodes always at points P1, P2, ..., P3 and P4 along the entire length of any one of the aforesaid recording tracks for every rotation of the magnetic sheet. It is at these points that no erasing occurs.

It is therefore an object of the present invention to provide an erasing device in which an erase signal, which varies periodically, is applied to a magnetic head to form a magnetic field by which the information on a record bearing medium is erased during the relative rotation of the medium and the entire track on the medium is properly and sufficiently erased in spite of the occurrence of the nodes of the erasing magnetic field due to the periodic change of the erase signal.

Another object of the invention is to provide an erasing device with a simple circuit structure which increases the frequency accuracy of an erase signal, whereby the residual noise is lessened, and high erasing performance is obtained.

Still another object of the invention is to provide an erasing device very well suited for instruments dealing with TV signals.

Other objects, aspects and features of this invention will become apparent from the following description of embodiments thereof by reference to the accompanying drawings.

SUMMARY OF THE INVENTION

To attain the first object, according to an embodiment of one aspect of the present invention, the erasing device includes a magnetic head; means for relatively rotating the magnetic head and a record bearing medium; means for producing an erase signal which varies periodically; and means for causing the magnetic head to produce a magnetic field with the erase signal, wherein the relationship between the frequency of relative rotation of the head and the record bearing medium and the frequency of the erase signal is determined so that no nodes of the erasing magnetic field are fixed at any point on a track of the record bearing medium during a plurality of relative rotations of the head and the record bearing medium.

According to a specific embodiment, the frequency $f_V$ of the aforesaid relative rotation and the frequency $f_E$ of the erase signal together satisfy the following condition:

$$f_E \neq (k/2)f_V, \text{ or } f_E = (m/n)f_V$$

where k and m are positive integers, n is an integer no smaller than 3, and m/n is an irreducible fraction.

To attain the second and third objects, according to another embodiment employing another aspect of the invention, an erasing device includes a magnetic head, means for relatively rotating the magnetic head and a record bearing medium, a horizontal TV synchronization signal source, means for dividing the frequency of the output of the horizontal TV synchronization signal source to produce an alternating erase signal, and means for generating an erasing magnetic field on the magnetic head by applying the erase signal from the erase signal producing means to the magnetic head.

In this case, it is advantageous to put the first-stated aspect of the invention into the determination of the relationship between the frequency of relative rotation of the magnetic head and the record bearing medium and the frequency of the erase signal in such a way that no nodes of the erasing magnetic field are fixed at any point on a track of the record bearing medium during a plurality of rotations of the head and the medium.

BRIEF DESCRIPTION OF THE DRAWINGS

This invention will next be described in conjunction with a number of preferred embodiments by reference to the accompanying drawings in which.

DETAILED DESCRIPTION OF THE PREFERRED EMBODIMENTS

Figure 3:
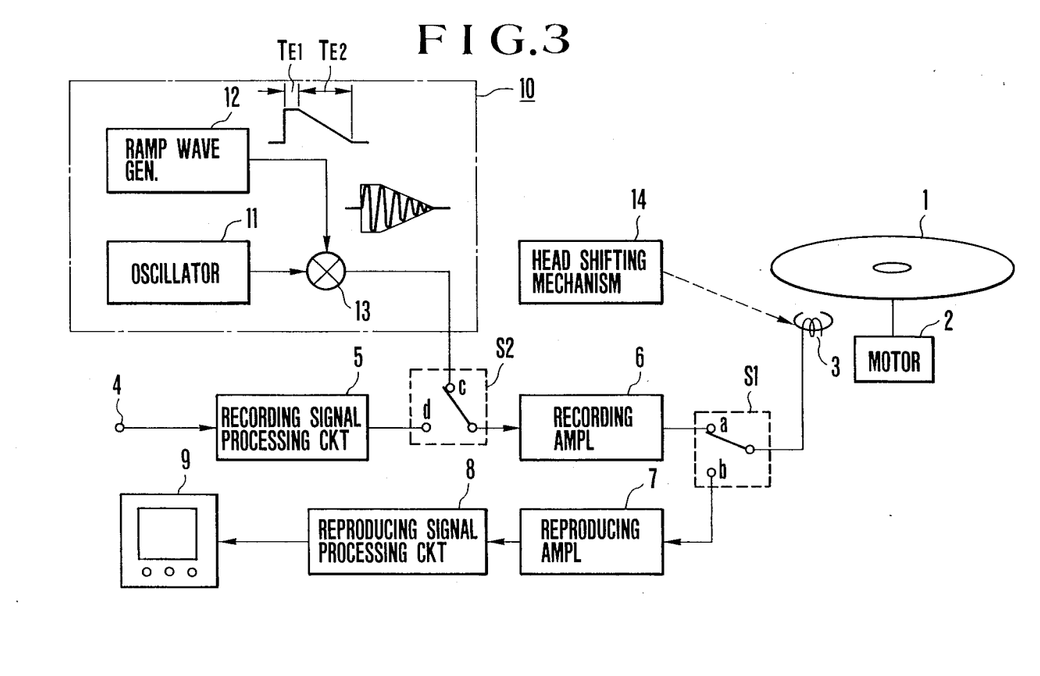
FIG. 3 is a block diagram of an embodiment of an erasing device according to the present invention.
Figure 4A:
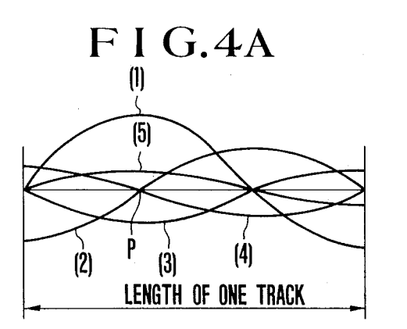
FIG. 4A is a waveform of erasing magnetic fields in the device of FIG. 3.
Figure 4B:
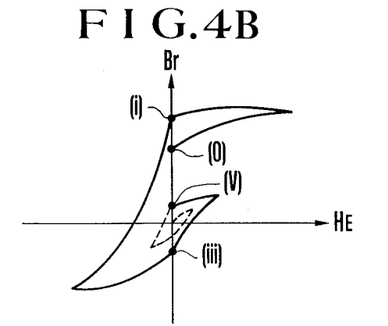
FIG. 4B is a coordinate illustrating how the residual magnetic flux of the record bearing medium changes as the erasing magnetic field changes.

[A First Embodiment] (FIGS. 3, 4A and 4B)

FIG. 3 illustrates an embodiment of the present invention to erase the signal recorded on a disc-shaped record bearing medium along with a recording system and a reproducing system. In the drawing, a disc-shaped magnetic record bearing medium 1 may be in the form of either a magnetic sheet or a magnetic disc. In the following description of the embodiment, it is assumed to be a magnetic sheet. The magnetic sheet 1 is rotated by an electric motor 2 relative to a magnetic head 3. In this illustrated embodiment, the magnetic head 3 serves as a recording and/or reproducing head which also serves as an erasing head. Of course, this head 3 may be solely used as the erasing head. Video signals (TV signals) to be recorded are applied to an input terminal 4 and are converted to signals suitable for recording while passing through a recording signal processing circuit 5 of which the output is connected to a throw "d" of a switch S2. A pole of the switch S2 is connected to an input of a recording amplifier 6, of which the output is connected to a throw "a" of a recording/reproducing mode selector or switch S1. A pole of the switch S1 is connected to the magnetic head 3. In this case, the magnetic head 3 is radially shifted by a known head shifting mechanism 14 so that recording tracks are concentrically arranged on the sheet 1. When reproduction is performed, the signals recorded on the magnetic sheet 1 are picked up by the magnetic head 3, and applied through another throw "b" of the switch S1 to a reproducing amplifier 7, then to a reproducing signal processing circuit 8 and then to a display device 9 where pictures can be viewed. The output of the reproducing signal processing circuit 8 may be otherwise applied to a printer (not shown). The signals to be recorded, besides the aforesaid video signals, include sound signals or other signals.

An erase signal source 10 is designed to produce an erase signal which is of a waveform, for example, that shown in FIG. 1. For this purpose, the erase signal source 10 is constructed with an A.C. oscillator 11, a ramp wave generator 12 and a multiplier 13. An alternating signal of the frequency $f_E$ from the oscillator 11 and a ramp wave from the generator 12 are multiplied at the multiplier 13 to obtain an erase signal. This erase signal is applied through another throw "c" of the switch S2 to the recording amplifier 6 and therefrom through the throw "a" of the switch S1 to the head 3, whereby the signal recorded on the signal 1 is erased.

The relationship between the frequency $f_E$ of the alternating erase signal produced from the A.C. oscillator 11 and the rotation frequency $f_V$ of the sheet 1 will now be explained. At first, the erase signal frequency $f_E$ though it depends on the rotation frequency of the sheet 1, the frequency band of the recording or reproducing signals and the materials of the sheet 1 and the head 3, is found appropriately to be within a range of 0.5 to 5 KHz under the condition that based on, for example, an NTSC system, the rotation frequency of the sheet 1 is 60 Hz, and one field of video signals is recorded in each concentric track. In the device of FIG. 3 embodying the present invention, it is within the above-stated range that the values of the above-defined $f_E$ and $f_V$ are determined so that the nodes of the erasing magnetic field are not fixed at any point on a recording track of the sheet 1 during a plurality of rotations of the sheet 1. This may be defined by the following formula:

$$f_E = (m/n)f_V \tag{1}$$

where m is the positive integer, n is the integer no smaller than 3, and m/n is the irreducible fraction. For simplicity:

$$f_E \neq (k/2)f_V \tag{2}$$

where k is the positive integer.

Next, considering the numerical values of the time periods $T_{E1}$ and $T_{E2}$ of FIG. 1, it is appropriate that $T_{E1}$ is 0.1 to 1 second, and $T_{E2}$ is 1 to 2 seconds. Also, the oscillation in the time period $T_{E1}$ has a constant amplitude. For the time period $T_{E1}$ of 0.2 to 0.4 seconds, a proper value of the amplitude is 30 to 40 mA.

FIGS. 4A and 4B represent an erasing effect when the erase signal frequency $f_E$ satisfies the formula (1) with respect to the sheet 1 rotation frequency $f_V$ with the parameters m and n taken at 3 and 4 respectively, for the purpose of simplifying the explanation. In FIG. 4A, the abscissa is in the length of any one of the concentric tracks, and five curves labelled (1) to (5) are waves of the erasing magnetic field successively formed on the track as the sheet 1 rotates through its first to fifth revolutions respectively. Let us now look at a point P in a track to be erased. In the first revolution, a magnetic field (1) is formed by that part of the erase signal which has the constant amplitude for the time period $T_{E1}$. It is therefore at the point P that the magnetic field becomes a large value with positive polarity. In the second revolution, a node of the magnetic field (2) reaches the point P. In the third revolution, the point P is given a magnetic field (3) of negative polarity with a smaller magnitude than during the first revolution. In the fourth revolution, it coincides with a node of the magnetic field (4). In the fifth revolution, the magnetic field (5) at the point P is of the same phase as in the first revolution and has a still smaller magnitude than in the third revolution. From the sixth revolution onward, a procedure similar to that above is repeated.

FIG. 4B illustrates variation of a residual magnetic flux Br in the magnetic sheet 1 with variation of an erasing magnetic field $H_E$ of FIG. 4A. The point P on the magnetic sheet 1 is assumed to be initially magnetized to a value (0). By the first erasing magnetic field (1), it is then magnetized to a saturation level, leaving the residual magnetic flux Br at (i). The magnetization is then reversed by the third erasing magnetic field (3), so that the residual magnetic flux Br changes to (iii). Furthermore, by the fifth erasing magnetic field (5), the point P is magnetized in the same direction as the first magnetic field (1), leaving the residual magnetic flux Br at (v). As subsequent waves of the magnetic field are applied, the residual magnetic flux Br finally converges to substantially zero. It should be recognized that at any point other than the point P there are no fixed nodes of erasing magnetic field during the plurality of rotations of the magnetic sheet 1 and thus the track can always be well erased in its entirety.

The foregoing discussion has been based on $f_E=(3/4)f_V$ for the purpose of simplicity. For the general case of $f_E=(4r+3/4)f_V$ (where r is a positive integer including 0), the erasing magnetic field behaves in a similar manner to that shown in connection with FIG. 4, so that at any point in an arbitrarily chosen track of the sheet 1, no nodes of the erasing magnetic field are fixed during a plurality of revolutions of the sheet 1. Thus, erasing can be performed in a shorter time with high efficiency. In this connection it should be noted that it has been experimentally proven that the erasing efficiency is highest when the phase difference between the successive two erasing magnetic fields is 90°, so shown in FIGS. 4A and 4B.

In operating the erasing device of FIG. 3, to erase the signal from a desired track of the magnetic sheet 1, the operator will first bring the magnetic head 3 into alignment with the desired track by the head shifting mechanism 14 of known construction, and then change over the switches S1 and S2 to their respective throws "a" and "c", whereby the magnetic head 3 is supplied with the erase signal. Because the erase signal includes an oscillation of constant amplitude for the time period $T_{E1}$ and the following oscillation of damping or gradually decreasing amplitude for the time period $T_{E2}$, erasing is effected in such a manner that during the time period $T_{E1}$ when oscillation with a constant amplitude takes place, the magnetic sheet 1 is magnetized to the saturation level to erase the original signals recorded on that track. Then during the time period $T_{E2}$, when oscillation with damping or gradually decreasing amplitude takes place, the residual strain is removed.

Furthermore, if the frequency $f_E$ of the erase signal is taken at a value beyond the lower end of the frequency band of the recording or reproducing signals, since the magnetic permeability of the magnetic head 3 is high for such a low-frequency signal, thus enlarging the flux density, erasing efficiency is improved so that erasing can be completed in a shorter time. Also, even if a fraction of the erase signal is left behind, which will probably appear as a beat component when in reproduction, its magnitude does not exceed a level as low as negligible. Another advantage arising from the use of the low frequency signal is that because the leakage flux from the gap portion of the magnetic head 3 to the outside is largely increased, even if the head 3 is more or less misaligned with the track, it can be erased sufficiently. It is needless to say that the above-described advantages can be fundamentally insured regardless of whether the present invention is applied to the type of recording and/or reproducing apparatus in which the head serves as an erasing head, or another type in which an additional head is used solely for erasing purposes.

Figure 5A:
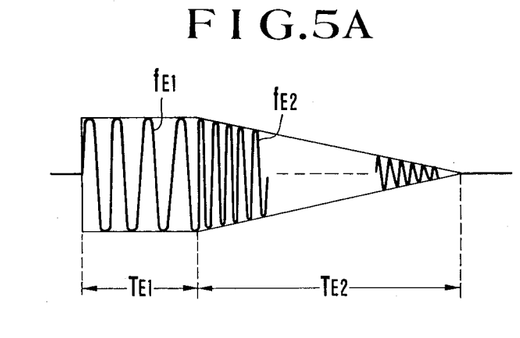
FIGS. 5A and 5B are waveforms of other examples of the erase signal usable in the erasing device of the invention.
Figure 5B:
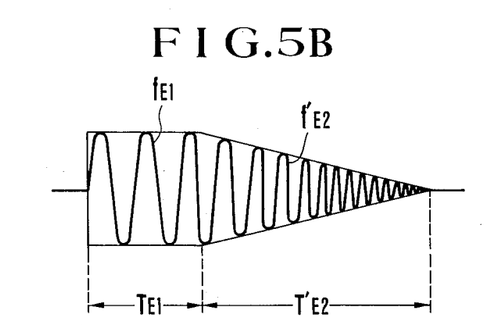
Figure 6:
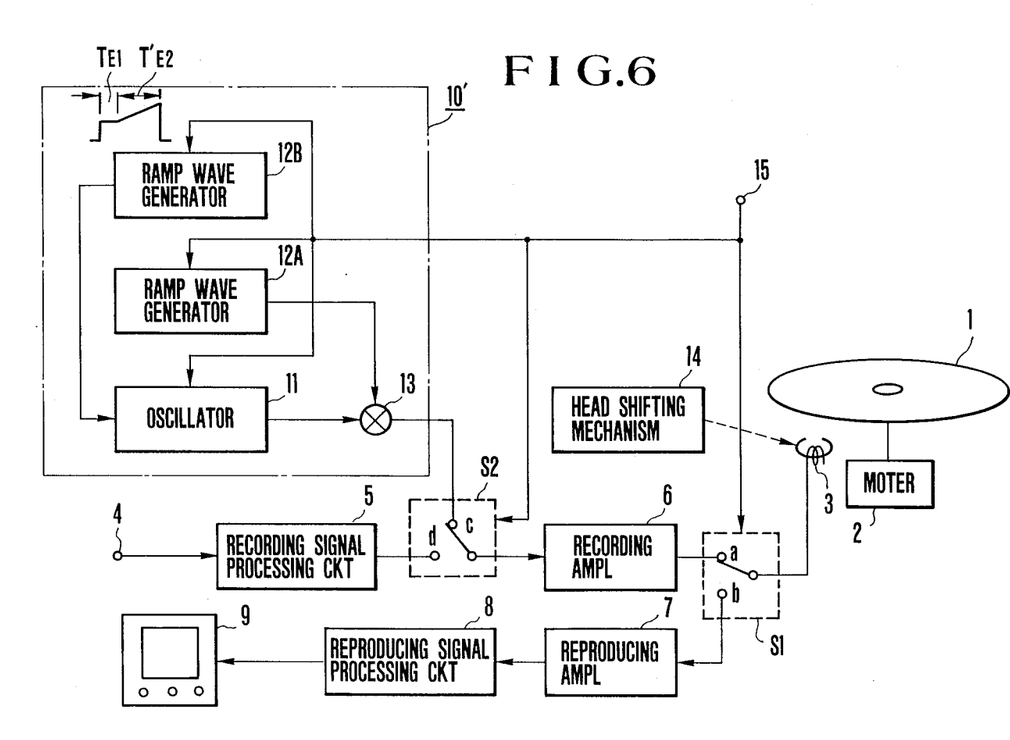
FIG. 6 is a block diagram of another embodiment of the erasing device according to the present invention.

[A Second Embodiment] (FIGS. 5A, 5B and 6)

While, in the first embodiment, the frequency $f_E$ of the erase signal has the same value in both the constant amplitude oscillation period $T_{E1}$ and the damping oscillation period $T_{E2}$ of FIG. 1, the second embodiment of the invention is to shorten the time of removing the residual strain from that in the first embodiment, or if the erasing time is the same in value, to further improve the erasing efficiency, either by making the frequency of the damping oscillation higher than that of the constant amplitude oscillation, or by making the speed of relative rotation of the magnetic head and the record bearing medium slower in the damping oscillation period $T_{E2}$ than in the constant amplitude oscillation period $T_{E1}$ to equivalently shorten the recording wavelength of the erase signal. Also, in the second embodiment, the use of the erasing means of the invention eliminates the possibility of forming nodes of the erasing magnetic field fixed at any point on the track of the medium during a plurality of relative rotations of the magnetic head 3 and the record bearing medium.

To increase a frequency $f_{E2}$ of the damping oscillation from a frequency $f_{E1}$ of the constant amplitude oscillation, there are two possible methods, one of which is to give the frequency $f_{E2}$ a higher constant value than the frequency of $f_{E1}$ as illustrated in FIG. 5A. The other method is by gradually increasing a frequency $f'_{E2}$ of the dampling oscillation higher than the value of the frequency $f_{E1}$ as shown in FIG. 5B. From the standpoint of shortening the erasing time, or improving erasing efficiency, it can be said that the latter method of FIG. 5B is superior to the former method of FIG. 5A.

FIG. 6 illustrates another embodiment of the erasing device in which the damping oscillation of FIG. 5B is used. In the drawing, the parts identified by the same reference numerals as those shown in FIG. 3 have substantially the same constructions and functions. An erase signal source 10' of FIG. 6 is provided with two ramp wave generators 12A and 12B. Of these, the first ramp wave generator 12A, similar to the ramp wave generator 12 of FIG. 3, produces a ramp wave corresponding to the envelope of the erase signal of FIG. 1. On the other hand, the ramp wave of the second ramp wave generator 12B has such a shape that as shown in the drawing, a constant low level is followed by a gradual ascendant slope. In this case, the oscillator 11 must take the form of, for example, a voltage controlled oscillator (VCO) where the frequency of oscillation is controlled based on the level of the output of the second ramp wave generator 12B. The output of the oscillator 11 is multiplied by the output of the first ramp wave generator 12A at the multiplier 13. A mode changeover signal appears at an input terminal 15. When this signal indicates the recording mode, the switch S1 is changed to its throw "a", and the switch S2 to its throw "d". When the signal indicates the reproducing mode, the switch S1 is changed to its throw "b". Furthermore, when the signal indicates the erasing mode, the switches S1 and S2 are changed over to their throws "a" and "c" respectively, and the oscillator 11 and the ramp wave generators 12A and 12B are rendered operative, producing the above-described ramp waves. After the time period ($T_{E1} + T_{E2}'$) of FIG. 5B has elapsed, their operation stops. By such an erasing device, an oscillation in which the amplitude is preferably maintained constant is produced for a time $T_{E1}$, and a damping oscillation of which the frequency $f'_{E2}$ gradually increases is produced for the subsequent time $T_{E2}$.

To modify the erasing device so that the damping oscillation has a constant frequency $f_{E2}$ during the time $T_{E2}$ as shown in FIG. 5A, there is the need to provide only, for example, means for controlling the second ramp wave generator of FIG. 6 in such a manner that the ramp wave has a relatively low level for the time period $T_{E1}$, and a relatively high level for the time period $T_{E2}$, and these levels are maintained constant during the respective time periods.

In connection with the application of the invention to the erasing device shown in FIGS. 5A, 5B and 6, it should be pointed out that in the first case of FIG. 5A where the $f_{E1}$ and the $f_{E2}$ are constant, the values of these frequencies must be chosen to satisfy the above-defined formula (1) or determined with respect to the rotation frequency $f_V$ of the sheet 1. On the assumption that the rotation frequency $f_V$ is constant, when determining the values of $f_{E1}$ and $f_{E2}$, it is apparent that the parameters "m" and "n" each take a different value therebetween, provided that this value falls in the range described in connection with the formula (1). In the second case of FIG. 5B where $f'_{E2}$ gradually varies in value, though the satisfaction of the formula (1) will be broken for some of the values of $f'_{E2}$, since the frequency immediately changes, there is substantially no possibility of forming nodes of the erasing magnetic field at any point on the track during a plurality of revolutions of the sheet 1.

In the second embodiment, instead of differentiating the frequency of the damping oscillation in the time period $T_{E2}$ or $T'_{E2}$ of FIG. 5A or 5B from that of the constant amplitude oscillation, it is also possible to otherwise effect an equivalent result to that described above by decreasing the rotation frequency of the magnetic sheet 1 (in general, the frequency of relative rotation of the magnetic head and the record bearing medium). That is, in the general case, $$\lambda_E = v_E/f_E$$

where reference symbol $\lambda_E$ identifies a recording wavelength of the erase signal, $v_E$ a relative speed of the magnetic head 3 and the magnetic sheet 1, and $f_E$ a frequency of the erase signal. As the relative speed $v_E$ decreases, it is, therefore, possible even when the frequency $f_E$ of the erase signal is constant, that the recording wavelength $\lambda_E$ is shortened to producing a result equivalent to that obtained by increasing the frequency of the erase signal. For example, in FIG. 6, by decreasing the rotation frequency of the sheet 1 in the damping oscillation period $T_{E2}$ from that in the constant amplitude oscillation period $T_{E1}$, the recording wavelength in the former can, therefore, be changed either to a shorter constant value $\lambda_{E2}$ than the value $\lambda_{E1}$ in the latter, or to shorter and gradually decreasing values $\lambda'_{E2}$ than the value $\lambda_{E1}$ in the latter. In this connection it should be noted that, from the standpoint of shortening the erasing time, it is more advantageous to use the method of gradually shortening the recording wavelength $\lambda'_{E2}$ in the damping oscillation period $T_{E2}$, as is similar to the above-described case of FIG. 5B.

To vary the rotation frequency of the magnetic sheet 1, use may be made of a speed control circuit, a standard clock generator and a timing circuit for a sheet rotating motor (2 in FIG. 6), wherein responsive to the aforesaid erasing mode signal, the timing circuit starts to count the time period $T_{E1}$ for which the standard clock generator produces a train of pulses with a first frequency, and when the counting of the timing circuit transits to the time period $T_{E2}$ or $T'_{E2}$, the standard clock generator changes its frequency either to a second value lower than the first value, or to gradually decreasing values by voltage control, for example, whereby the speed of rotation of the motor 2 is controlled in accordance with the frequency of the standard clock signal by the speed control circuit.

In application of the invention to the apparatus having such rotation frequency varying means for the magnetic sheet 1, since the above-defined $\lambda_{E1}$ and $\lambda_{E2}$ are constant, the value of the rotation frequency $f_V$ of the magnetic sheet 1 may be determined in such a way as to equivalently satisfy formula (1) with respect to the recording wavelength where similar to the above, the values of "m" and "n" used in determining the values of $\lambda_{E1}$ and $\lambda_{E2}$ based on the formula (1) are different in each parameter. In another case where $\lambda'_{E2}$ gradually varies in value, of these values some do not satisfy the formula (1). But, because the recording wavelength rapidly changes, there is substantially no possibility of forming nodes of the erasing magnetic field at any point on the track of the sheet 1 during a plurality of revolutions of the sheet 1. In the above-described second embodiment, the means for increasing the frequency of the erase signal and the means for lowering the rotation speed of the magnetic sheet 1 during the aforesaid damping oscillation period may be used at a time with the advantage of achieving a further decrease in the erasing time, or a further improvement in erasing efficiency.

Figure 7:
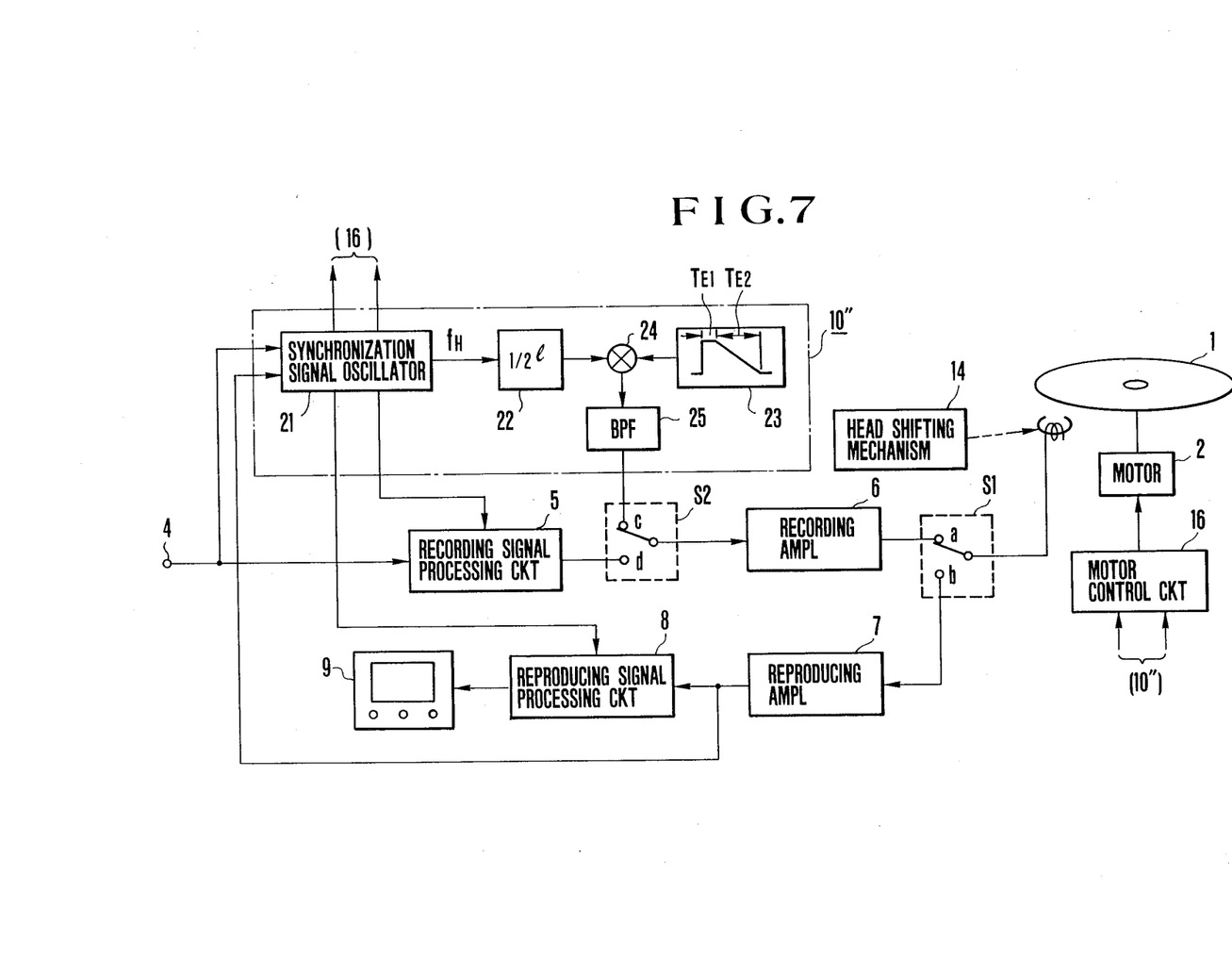
FIG. 7 is a block diagram of still another embodiment of the erasing device according to the present invention.
Figure 8A:
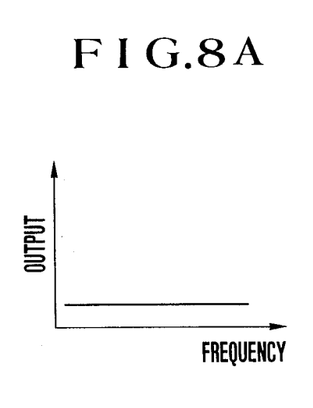
FIGS. 8A and 8B are graphs of noise spectra of erase signals obtained with and without the use of a band pass filter in the erasing device of FIG. 7.
Figure 8B:
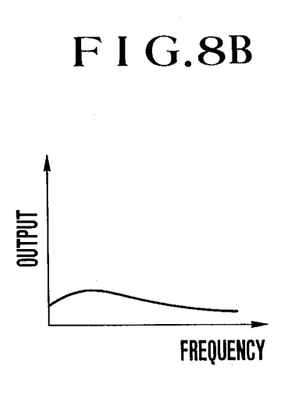

[A Third Embodiment] (FIGS. 7, 8A and 8B)

FIG. 7 illustrates still another embodiment of the invention applied to erase the signal recorded on the disc-shaped record bearing medium 1 along with a recording system and a reproducing system. In the drawing, the elements identified by the same reference numerals as those in FIGS. 3 and 6, are fundamentally similar in construction and function to those of the foregoing embodiments. Therefore, explanation is mainly about the parts which are different from those in the foregoing embodiments.

An erase signal source 10″ is constructed with a television (TV) synchronization signal oscillator 21, a frequency divider 22, a ramp wave generator 23, a multiplier 24, and a band pass filter (BPF) 25 for passage of the erase signal frequency $f_E$. The oscillator 21 produces a horizontal TV synchronization signal of which the frequency is divided by the frequency divider 22 to $\frac{1}{2^l}$ (l is a positive integer). This frequency-divided output is multiplied by a ramp wave of which the form is shown, for example, in the drawing, from the ramp wave generator 23 by the multiplier 24. The output of the multiplier 24 is applied through the band pass filter 25 as an erase signal to a throw "c" of the switch S2. Note, the horizontal TV synchronization signal serves as the source of the erase signal, instead of obtaining it from the synchronization signal oscillator 21 incorporated in the recording and/or reproducing apparatus as shown in FIG. 7. It may otherwise be obtained from another TV synchronization signal oscillator of a separate apparatus.

The output of the synchronization signal oscillator 21 is applied to the recording signal processing circuit 5 and the reproducing signal processing circuit 8. In each it controls the clamping operation and the like of the signal, and it is also applied to a motor control circuit 16 whereby the motor 2 is servo-controlled.

With regard to the relationship between the frequency $f_E$ of the above-described erase signal and the rotation frequency $f_V$ of the magnetic sheet 1 (generally speaking, the frequency of relative rotation of the magnetic head 3 and the record bearing medium 1), it is preferable to determine these values so that no nodes of the erasing magnetic field are fixed at any point on the track during a plurality of revolutions of the sheet 1, that is, based on the above-mentioned formula (1) or (2).

With the proper waveform of the erase signal, use may be made of that shown in FIG. 1. But the waveforms of FIGS. 5A and 5B can be employed with the frequency divider 22 so modified.

The numerical data for the frequencies $f_E$ of the erase signal, as obtained by dividing the frequency of the output of the synchronization signal oscillator 21, are listed in the following table, where according to, for example, the NTSC system, the horizontal synchronization signal frequency $f_H = 15.734$ KHz for the color video signals is divided by $2^l$ to obtain the frequency $f_E$ of the erase signal.

| l | $f_E = f_H/2^l$ (KHz) |
|---|---|
| 2 | 3.9335 |
| 3 | 1.96675 |
| 4 | 0.983375 |
| 5 | 0.491688 |

And, these values of the frequency $f_E$ of the erase signal each satisfy the above-defined formula (2) for the following value of the rotation frequency $f_V$ of the sheet 1

$f_V = 15.734$ KHz$/262.5 = 59.939$ Hz

Experiments have proven that with the use of a waveform similar to that of the above-described first embodiment, when the frequency $f_E = 1.96675$ KHz is chosen from the above table, an excellent erasing characteristic is obtained. It is also found that the optimum value of the erase signal frequency $f_E$ differs with different rotation frequencies of the sheet 1, different frequency bands of the recording or reproducing signals, and different materials of the sheet 1 and the head 3.

Since the synchronization signal oscillator 21 has a high frequency accuracy, the use of the erase signal obtained by dividing the frequency of its oscillation output provides a possibility of reducing the residual noise with an improvement in the erasing performance. To achieve a further improvement in the erasing performance, the band pass filter 25 is used, as indicated in FIG. 7, for removing from the erase signal a high frequency component which will become residual noise. FIG. 8A illustrates a spectrum of the noise reproduced from the track which was erased with the use of the band pass filter 25 for passing the erase signal frequency $f_E$. Upon comparison with another spectrum obtained without the use of the band pass filter 25 shown in FIG. 8B, it is understandable that an improvement in the spectrum has been achieved.

Though the foregoing preferred embodiments have been described in connection with the disc-shaped record bearing medium 1, the present invention is applicable to another type of recording and/or reproducing apparatus employing cylinder (or drum) shaped record bearing media. Furthermore, the present invention is also applicable to still another type of apparatus in which, as in the video tape recorder, for example, the head 3 is rotated relative to the magnetic tape when the signals are recorded or reproduced, and when erasing the recorded signals in each of the recording tracks, the head 3 is rotated while the tape is held stationary. In this case, the above-defined formula (1) or (2) sets forth the relationship between the rotation frequency of the head 3 (if two or more heads are used, the rotation frequency is defined by taking into account the number of heads) and the frequency of the erase signal, thereby it being made possible to solve the problem that the nodes of erasing magnetic field are fixed at any point on the track during a plurality of rotations of the head relative to the magnetic tape. Further, by obtaining the erase signal from the horizontal TV synchronization signal through the frequency divider, it is made possible to increase the accuracy of frequency control of the erase signal, and, therefore, to leassen the residual noise with increase in the grade of erasing performance.

As has been described above, according to one of the aspects of the invention, an erasing device in which a magnetic head is supplied with an erase signal which varies periodically to produce a magnetic field for effecting erasing during the relative rotation of the head and a record bearing medium, is arranged to have a predetermined relationship between the frequency of the aforesaid relative rotation and the frequency of the erase signal so that at any point on the track of the record bearing medium no fixed nodes of the aforesaid erasing magnetic field are occurred during a plurality of relative rotations of the head and the medium. This produces an advantage that all points on the track are subjected to the effective erasing magnetic field so that the erasing can be performed with a high efficiency in a short time.

Also according to another aspect of the invention, the erasing device in which while the magnetic head and the record bearing medium are relatively rotated, a magnetic field is formed on the magnetic head by the erase signal to effect erasing, is provided with means for obtaining the erase signal by frequency dividing the horizontal TV synchronization signal, thereby giving an advantage that without the necessity of employing a separate oscillator solely used for producing the erase signal, the circuitry of the erasing device can be constructed in simple form, while still permitting the accuracy of frequency control of the erasing signal to be increased, and, therefore, that the erasing can be performed with high accuracy, leaving little residual noise behind.

What is claimed is:

1. A device for erasing a recorded signal from a record bearing medium, comprising:
   (A) a head;
   (B) means for relatively rotating said head and said record bearing medium at least a plurality of times; and
   (C) means for supplying said head with an alternating erase signal to cause the head to generate an alternating erasing magnetic field while said head and said record bearing medium are relatively rotated at least said plurality of times by said rotating means, wherein the relationship between the frequency of relative rotation of said head and said record bearing medium and the frequency of said erase signal is determined so that at any point on a recording track of said record bearing medium no fixed nodes of said erasing magnetic field are occurring during a plurality of relative rotations of said head and said record bearing medium.

2. The device according to claim 1, wherein the frequency $f_E$ of said erase signal is represented by the formula: $f_E = (m/n)f_V$ where m is a positive integer, n is an integer no smaller than 3, and m/n is an irreducible fraction.

3. The device according to claim 1, wherein the frequency $f_V$ of relative rotation of said head and said record bearing medium and the frequency $f_E$ of said erase signal together satisfy the following condition: $f_E \neq (k/2)f_V$ where k is a positive integer.

4. The device according to claim 3, wherein said recorded signal has a predetermined frequency range; and said erase signal has a frequency lower than those within said predetermined frequency range of the recorded signal and includes a signal portion with a gradually decreasing amplitude.

5. The device according to claim 4, wherein said erase signal further includes a signal portion with a constant amplitude followed by said signal portion with the time-dependent decreasing amplitude.

6. The device according to claim 2, wherein said recorded signal has a predetermined frequency range; and said erase signal includes a first signal portion and a second signal portion following said first signal portion, said first signal portion having a substantially constant amplitude and a frequency lower than those within said predetermined frequency range of the recorded signal, and said second signal portion having a gradually decreasing amplitude and including a frequency higher than that of the first signal portion.

7. The device according to claim 6, wherein said second signal portion of said erase signal has a substantially constant frequency higher than that of said first signal portion.

8. The device according to claim 6, wherein said second signal portion of said erase signal has a gradually increasing frequency having a maximum frequency higher than that of said first signal portion.

9. A device for erasing a recorded signal from a rotary type magnetic record bearing medium, comprising:
   (A) a head;
   (B) positioning means for positioning said head the record bearing medium at a position where a signal to be erased is recorded;
   (C) drive means for rotating the record bearing medium relative to said head at least a plurality of times; and
   (D) erase signal supply means for supplying said head with an alternating erase signal while said recording medium is rotated at least said plurality of times with respect to said head by said drive means, wherein letting $f_V$ denote a frequency of the rotation of the medium by said drive means $f_E$ a frequency of said erase signal, and k a positive integer, $f_E$ satisfies the following formula:

$$f_E \neq (k/2)f_V.$$

10. The device according to claim 9, wherein said recorded signal has a predetermined frequency range; and said erase signal has a frequency lower than those within said predetermined frequency range of the recorded signal and includes a signal portion with a gradually decreasing amplitude.

11. The device according to claim 10, wherein said erase signal further includes a signal portion with a constant amplitude followed by said signal portion with the time-dependent decreasing amplitude.

12. The device according to claim 9, wherein said recorded signal has a predetermined frequency range; and said erase signal includes a first signal portion and a second signal portion following said first signal portion, said first signal portion having a substantially constant amplitude and a frequency lower than those within said predetermined frequency range of the recorded signal, and said second signal portion having a gradually decreasing amplitude and including a frequency higher than that of the first signal portion.

13. The device according to claim 12, wherein said second signal portion of said erase signal has a substantially constant frequency higher than that of said first signal portion.

14. The device according to claim 12, wherein said second signal portion of said erase signal has a gradually increasing frequency having a maximum frequency higher than that of said first signal portion.

* * * * *